United States Patent
DiBiase (12)

(10) Patent No.: US 7,987,057 B1
(45) Date of Patent: Jul. 26, 2011

(54) INTELLIGENT STITCHING BOUNDARY DEFECT INSPECTION

(75) Inventor: Tony DiBiase, San Jose, CA (US)

(73) Assignee: KLA-Tencor Corporation, Milpitas, CA (US)

( * ) Notice: Subject to any disclaimer, the term of this patent is extended or adjusted under 35 U.S.C. 154(b) by 427 days.

(21) Appl. No.: 12/199,747

(22) Filed: Aug. 27, 2008

Related U.S. Application Data

(60) Provisional application No. 60/970,543, filed on Sep. 7, 2007.

(51) Int. Cl.
*G01R 31/00* (2006.01)

(52) U.S. Cl. ........................................ 702/59
(58) Field of Classification Search .............. 702/59
See application file for complete search history.

(56) References Cited

U.S. PATENT DOCUMENTS

2001/0019412 A1* 9/2001 David ........................... 356/399
2008/0073589 A1* 3/2008 Adel et al. ................ 250/492.22

* cited by examiner

*Primary Examiner* — Aditya Bhat
(74) *Attorney, Agent, or Firm* — Luedeka, Neely & Graham, P.C.

(57) ABSTRACT

A method of inspecting a pattern on a substrate, by extracting boundary locations from design data for repeating blocks within the pattern, inspecting the substrate at only the boundary locations of the repeating blocks, detecting alignment errors at the boundary locations, comparing the alignment errors to a threshold, and flagging the alignment errors that exceed the threshold. In this manner, the alignment errors that were of no consequence in larger design rule devices can be detected, and a determination can be made as to whether they adversely impact the proper operation of the integrated circuit that will eventually be formed from the pattern. By performing the inspection only on the boundary locations, a much higher magnification can be used than what would be reasonably possible for an inspection of the entire substrate.

1 Claim, 1 Drawing Sheet

INTELLIGENT STITCHING BOUNDARY DEFECT INSPECTION

FIELD

This application claims all rights and benefits on U.S. provisional patent application 60/970,543 filed 2007 Sep. 7. This invention relates to the field of integrated circuits. More particularly, this invention relates to inspecting integrated circuit patterns for boundary alignment defects.

BACKGROUND

Integrated circuits are typically formed using photolithographic processes in which a pattern is projected from a reticle or mask onto a substrate, and then the pattern is etched or otherwise formed into the substrate. This general process is repeated over and over again as additional layers are formed on the substrate, until the integrated circuit is completed.

As the term is used herein, "integrated circuit" includes devices such as those formed on monolithic semiconducting substrates, such as those formed of group IV materials like silicon or germanium, or group III-V compounds like gallium arsenide, or mixtures of such materials. The term includes all types of devices formed, such as memory and logic, and all designs of such devices, such as MOS and bipolar. The term also comprehends applications such as flat panel displays, solar cells, and charge coupled devices.

Generally, the photo masks, reticles, templates, electron-beam large-area patterns, and even the production wafers themselves (all generally referred to as substrates herein) are typically formed by stepping smaller blocks of the pattern across the surface of the substrate, and logically stitching these blocks together to form the larger, desired pattern, and then just assuming that these small blocks line up in the desired manner.

In times past, the majority of tooling was intended to be photo reduced by a factor of four, so any stitching errors were typically reduced to about four or five nanometers, which was considered to be negligible. However, with the continued reduction in the size of the critical features of modern integrated circuits, and the advent of 1x tooling such as nano-imprint and x-ray that are not photo reduced, these stitching errors could potentially create a significant problem.

What is needed, therefore, is a system that overcomes problems such as those described above, at least in part.

SUMMARY

The above and other needs are met by a method of inspecting a pattern on a substrate, by extracting boundary locations from design data for repeating blocks within the pattern, inspecting the substrate at only the boundary locations of the repeating blocks, detecting alignment errors at the boundary locations, comparing the alignment errors to a threshold, and flagging the alignment errors that exceed the threshold. In this manner, the alignment errors that were of no consequence in larger design rule devices can be detected, and a determination can be made as to whether they adversely impact the proper operation of the integrated circuit that will eventually be formed from the pattern. By performing the inspection only on the boundary locations, a much higher magnification can be used than what would be reasonably possible for an inspection of the entire substrate.

The embodiments of the invention can be implemented as computer programs on computer readable media, operable to instruct a computer to perform the steps of the method as indicated.

BRIEF DESCRIPTION OF THE DRAWINGS

Further advantages of the invention are apparent by reference to the detailed description when considered in conjunction with the figures, which are not to scale so as to more clearly show the details, wherein like reference numbers indicate like elements throughout the several views, and wherein.

DETAILED DESCRIPTION

Figure 1:
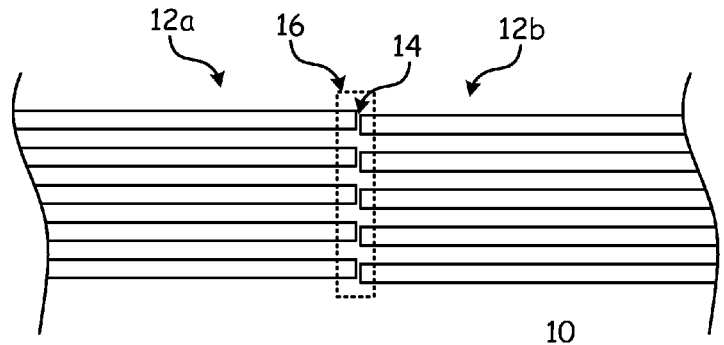
FIG. 1 depicts a portion of a boundary edge between two adjoining blocks of patterns on a substrate, and the inspection area according to an embodiment of the present invention.

With reference now to FIG. 1, there is depicted a portion of a pattern on a substrate 10. The substrate 10 could be one of a number of different kinds of substrates. For example, the substrate 10 could be a production wafer, such as a semiconducting wafer, on which integrated circuits are formed. The substrate 10 could also be a reticle or mask, which is used to project that pattern onto a production wafer. The substrate 10 could also be another substrate of the general type described in this disclosure, and which is used to transfer patterns to the production wafer, either directly or indirectly.

In this portion of the pattern as depicted in FIG. 1, there is an interface 14 between two repeating blocks of the pattern, 12a and 12b. As can be seen in FIG. 1, there is an alignment error between the two blocks 12a and 12b, which is generally referred to as a stitching error herein. As depicted, the alignment error occurs in both the x and y coordinates. As to the x coordinate, the bars of the two patterns 12a and 12b do not quite meet up with each other. As to the y coordinate, the bars of the two patterns 12a and 12b are slightly offset one from the other, with the bars of pattern 12a being slightly higher than the bars of pattern 12b.

Although such stitching errors might not have been significant in times past, as geometries continue to shrink, such stitching errors might become quite significant to the proper operation of the integrated circuit that will eventually be formed from the pattern.

Thus, according to an embodiment of the present invention, an inspection area 16 is defined, which includes all of the interfaces 14 between all of the blocks 12 on the substrate 10. The inspection area 16 is generally no wider than what is needed to include the edges of both of the blocks 1a and 12b, while accounting for some amount of alignment error. For example, if it could be assumed in a specific embodiment that the alignment gap between the two patterns 1a and 12b would never (or extremely rarely) be any wider than five microns, then the inspection area 16 could be set to a width of fifteen microns, which would allow for an inspection of five microns into each of the two blocks 12a and 12b.

In other embodiments, a somewhat smaller or somewhat larger inspection area 16 could be defined. However, according to the present invention, any inspection area 16 that is defined is significantly smaller than the overall size of the patterned substrate 10. In other words, only a very small portion of the substrate 10 is to be inspected in accordance with the present invention. One reason for this is that the magnification for the inspection should be sufficiently high as to detect the alignment errors at a desired degree, which might be a much higher magnification than other inspections of the substrate 10. Inspecting more than the boundary areas 14 of the substrate 10 at such a magnification would require an inordinate amount of time on the inspection equipment, which translates into an inordinate cost for the inspection process.

Figure 2:
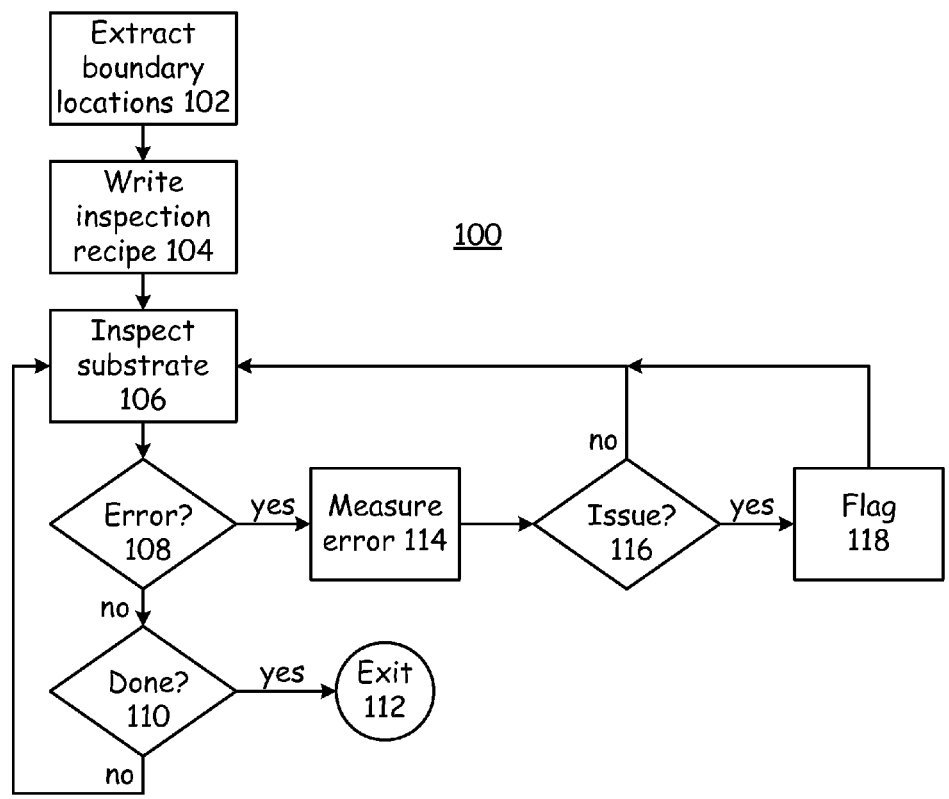
FIG. 2 depicts a flow chart for a method of inspecting a substrate according to an embodiment of the present invention.

With reference now to FIG. 2, a method of performing an inspection according to one embodiment of the present invention is now described. Using information from the eBeam writing tool, GDS file, and fracturing scheme, the locations of these stitching boundaries (interfaces) can be accurately determined, as given in block 102. The stitch boundary locations from the design data and the eBeam write tool are then used to directly create an inspection or review recipe, as given in block 104. In one embodiment, the method of setting up these recipes is to use the wafer pattern information while learning the areas manually. Once the coordinates are known, a very focused inspection recipe is created (for any type of inspection tool) that performs a scan of only the stitch boundary locations, as given in block 106. This inspection might be the only inspection performed on the substrate 10, or might be part of a larger scanning regimen.

During the scanning process, the information acquired from the inspection is evaluated to determine whether an alignment error exists, as given in block 108. If an alignment error is detected, then the degree of the error is measured, as given in block 114. The degree of the error is then weighed against design or other evaluation criteria, to determine whether the alignment error present an issue or problem that needs to be addressed, as given in block 116. If the issue does need to be addressed, then the alignment error is flagged in some manner, as given in block 118. Then the inspection continues, as given in block 106. If no error is found during the inspection process, then the inspection process merely continues until it is completed, as determined in block 110.

In addition to defect inspection, the boundary locations that are extracted in step 102 can also be used in a defect review tool (such as an optical or eBeam tool) to simply drive to the locations and inspect critical features by comparing them to the GDS database.

To briefly summarize one embodiment of the method, the chip design data in either GDS or some other CAD format is sent to an eBeam write fracture process. Knowing the spot size and the segment size in X and Y coordinates, the locations of the pattern block boundaries are determined. These boundaries are then converted to inspection areas or other inspection or review data formats. The recipe of inspection areas is run by itself or in conjunction with another recipe.

The foregoing description of preferred embodiments for this invention has been presented for purposes of illustration and description. It is not intended to be exhaustive or to limit the invention to the precise form disclosed. Obvious modifications or variations are possible in light of the above teachings. The embodiments are chosen and described in an effort to provide the best illustrations of the principles of the invention and its practical application, and to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

What is claimed is:

1. A processor-based method of inspecting a pattern on a substrate, the method comprising the steps of:
    extracting boundary locations from design data for repeating blocks within the pattern, where the repeating blocks are intended to be disposed adjacent one another in a substantially mating but non-overlapping arrangement,
    inspecting the substrate at only the boundary locations of the repeating blocks,
    detecting alignment errors with the processor at the boundary locations,
    comparing the alignment errors with the processor to a threshold, and
    flagging the alignment errors with the processor that exceed the threshold.

* * * * *